(12) United States Patent
Fangmann et al.

(10) Patent No.: US 7,806,429 B2
(45) Date of Patent: Oct. 5, 2010

(54) AIR BAG ASSEMBLY UNIT

(75) Inventors: Thomas Fangmann, Dinklage (DE); Keit Wagener, Bissendorf (DE); Hans-Juergen Imken, Hunteburg (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 478 days.

(21) Appl. No.: 11/814,733

(22) PCT Filed: Jan. 27, 2006

(86) PCT No.: PCT/DE2006/000126
§ 371 (c)(1),
(2), (4) Date: Jul. 25, 2007

(87) PCT Pub. No.: WO2006/079330
PCT Pub. Date: Aug. 3, 2006

(65) Prior Publication Data
US 2008/0129019 A1    Jun. 5, 2008

(30) Foreign Application Priority Data
Jan. 28, 2005  (DE) .................. 10 2005 004 286

(51) Int. Cl.
*B60R 21/20* (2006.01)
*B60R 21/217* (2006.01)
(52) U.S. Cl. .................. 280/728.2; 280/736; 280/741
(58) Field of Classification Search .............. 280/728.1, 280/728.2, 736, 741
See application file for complete search history.

(56) References Cited

U.S. PATENT DOCUMENTS

| | | | |
|---|---|---|---|
| 5,022,687 A * | 6/1991 | Ariga .................. | 285/321 |
| 5,257,815 A | 11/1993 | Bachelder et al. | |
| 5,421,607 A * | 6/1995 | Gordon .................. | 280/728.2 |
| 5,667,241 A * | 9/1997 | Bunker et al. .......... | 280/730.2 |
| 5,678,857 A * | 10/1997 | Johnson et al. ......... | 280/740 |
| 5,810,386 A * | 9/1998 | Kelley et al. .......... | 280/728.2 |
| 5,816,607 A * | 10/1998 | Bugdaci et al. ........ | 280/728.2 |
| 6,361,064 B1 * | 3/2002 | Hopf et al. ............ | 280/728.1 |
| 7,040,656 B2 * | 5/2006 | Sawa et al. ............ | 280/741 |
| 7,270,344 B2 * | 9/2007 | Schirholz et al. ..... | 280/728.2 |

(Continued)

FOREIGN PATENT DOCUMENTS

DE     43 10 173 C2    10/1993

(Continued)

*Primary Examiner*—Paul N. Dickson
*Assistant Examiner*—Barry Gooden, Jr.
(74) *Attorney, Agent, or Firm*—McGlew and Tuttle, P.C.

(57) ABSTRACT

An air bag assembly unit is provided for an occupant restraint systems in motor vehicles with an air bag, which is accommodated by an air bag housing and is to be filled with gas by the contents of a gas generator. The assembly unit includes a diffusor housing, which is arranged at the air bag housing, is connected to the air bag housing via gas passage openings, and in which the gas generator pushed in via an installation opening is fixed by a holding device. The holding device is formed from a fastening ring (7), which is arranged in the intermediate space (5) of the diffusor housing wall (8) and the gas generator wall (9), seals the intermediate space (5) by a sealing device (6) in a gas-tight manner and surrounds the gas generator (2) in a ring-shaped pattern. The fastening ring (7) is fixed at the diffusor housing wall (8) in a positive-locking manner.

20 Claims, 2 Drawing Sheets

U.S. PATENT DOCUMENTS

| | | | |
|---|---|---|---|
| 2002/0024197 A1* | 2/2002 | Thomas et al. | 280/728.2 |
| 2005/0225058 A1* | 10/2005 | Braun | 280/728.2 |
| 2006/0108775 A1* | 5/2006 | Schirholz et al. | 280/728.2 |
| 2008/0238044 A1* | 10/2008 | Wagener et al. | 280/728.2 |

FOREIGN PATENT DOCUMENTS

| | | |
|---|---|---|
| DE | 19743615 | 4/1999 |
| DE | 101 50 275 A1 | 4/2003 |
| EP | 1112901 A2 | 7/2001 |
| EP | 1 207 086 A2 | 5/2002 |

* cited by examiner

AIR BAG ASSEMBLY UNIT

CROSS REFERENCE TO RELATED APPLICATIONS

This application is a U.S. National Phase application of International Application PCT/DE 2006/000126 and claims the benefit of priority under 35 U.S.C. §119 German Patent Application DE 10 2005 004 286.4 of Jan. 28, 2005 filed, the entire contents of which are incorporated herein by reference.

FIELD OF THE INVENTION

The present invention pertains to an air bag assembly unit for an occupant restraint system in motor vehicles with an air bag, which is accommodated by an air bag housing and is to be filled with gas by the contents of a gas generator, as well as with a diffusor housing, which is arranged at the air bag housing and is connected to the air bag housing via gas passage openings.

BACKGROUND OF THE INVENTION

Such air bag assembly units are currently used in various designs in nearly all passenger cars manufactured by the automobile industry. The costs to be incurred by motor vehicle manufacturers for the use of such units are determined, usually rather essentially, by the mounting steps to be taken for the assembly of the air bag assembly units and the time and cost factors arising herefrom. Moreover, the problem arises that based on the intensive use of the motor vehicles, the expectations on the reliability and service life are subject to increasing requirements. These requirements lead, on the one hand, to increased efforts to guarantee, for example, the reliable sealing of the gas generator placed inside the air bag assembly unit in the diffusor housing to the outside over the service life of the vehicle. The effectiveness of sealing also depends decisively on the tolerances present due to the manufacture and the construction-related means necessary as a result for compensating tolerances between the assembly units to be assembled together.

Various proposed solutions are known from the state of the art to facilitate the assembly of air bag assembly units of this class and at the same time to ensure the reliability of operation in respect to the gas tightness of the mounted air bag assembly unit.

For example, an air bag assembly unit of an occupant restraint system for motor vehicles, in which the gas generator is screwed to the diffusor housing by means of a central screw connection after the gas generator has been introduced into the diffusor housing via an installation opening, is known from EP 1 207 086 A1. The installation opening is sealed such that a flange, which is brought into contact with a stop face on the diffusor housing during mounting, is provided at the gas generator, and an elastic sealing and uncoupling ring is introduced between the flange and the diffusor housing. The tasks of fastening the gas generator, on the one hand, and of sealing it within the diffusor housing against the outer environment, on the other hand, are thus accomplished by different components, whose joining increases the effort needed for mounting and hence the manufacturing effort.

In addition, a housing for an inflatable air bag, in which the diffusor housing is embodied as a component designed integrally with the air bag housing, wherein the gas generator is directly inserted into the diffusor housing and a connection to the diffusor housing inner wall is provided for fixing same in the diffusor housing, is known, for example, from the Offenlegungsschrift DE 10 150 275 A1. Even though a reduction of the components to be mounted is brought about here compared to the state of the art mentioned at first, the positive-locking connection between the gas generator and the diffusor housing inner wall permits, however, only the use of a certain gas generator assembly unit, so that changes in the component inevitably leads to a substantially increased effort needed for making changes on the air bag housing, which has a complex design due to its function. Moreover, tolerance compensation and sealing of the diffusor housing interior space towards the outside are subject to manufacturing measurements that are to be observed accurately and thus they are again cost-intensive in respect to the manufacture of the components to be connected to one another due to the integrated design of the air bag housing.

SUMMARY OF THE INVENTION

Based on the state of the art described, the object of the present invention is to perfect an air bag assembly unit of this class such that the joining of the components to be connected to one another can be carried out in a simple manner and that tolerance compensation between the components can be brought about in a simple manner, so that the reject rate of the individual components used is reduced. In addition, the reliability shall be further improved especially in terms of the gas tightness of the diffusor housing in the area of the installation opening for the gas generator against the external environment.

According to the invention, an air bag assembly unit is provided for an occupant restraint system in motor vehicles. The air bag assembly unit comprises a gas generator, a diffusor housing and a holding device. The gas generator is disposed in the diffuser housing and fixed therein by the holding device. An inner diffusor housing wall of the diffusor housing and an outer gas generator wall of said gas generator cooperate to define an intermediate space.

It is essential for the present invention that the holding device for fixing the gas generator in the diffusor housing is formed from a fastening ring, which surrounds the gas generator in a ring-shaped pattern, seals the intermediate space in a gas-tight manner by a sealing device and is arranged in the intermediate space of the diffusor housing wall and the gas generator wall, the fastening ring being fixed at the diffusor housing in a positive-locking manner.

The components of the diffusor housing and of the gas generator, which are to be connected to one another, are thus coupled with one another by a single additional component, which at the same time assumes the holding function between the diffusor housing and the gas generator. The mounting is simplified by the integration of the different functions in one component, and the fastening ring arranged between the diffusor housing and the gas generator can optionally be varied for different gas generators without a great effort without any changes being necessary on the air bag housing of the air bag assembly unit.

It proved to be especially useful to bring about the positive-locking fixing of the fastening ring at the diffusor housing wall by means of a snap-in device, wherein a special embodiment of the snap-in device provides for a plurality of elastic holding tabs, which are arranged radially on the outer circumference of the fastening ring and which mesh with corresponding recesses arranged on the diffusor housing wall in the installed state of the fastening ring. Fixing of the fastening ring in the diffusor housing in both the axial direction and the radial direction is ensured by this technical embodiment. Four holding tabs, which provide sufficient holding forces in their entirety, may be arranged radially on the outer circumference of the fastening ring, and, at the same time, excessively strong mounting forces are not necessary for providing the holding forces, and, moreover, the effort for embodying the positive-locking fixation of the fastening ring at the diffusor housing wall remains low.

In addition, an advantageous embodiment of the sealing device of the fastening ring provides for this sealing device to have two sealing lips, which are arranged such that they extend radially circumferentially at the fastening ring and which are arranged in relation to one another such that the sealing device forms an essentially V-shaped cross section, and wherein the leg ends connected to one another are arranged in the direction of the installation opening of the diffusor housing.

This special embodiment causes the increased internal pressure within the air bag assembly unit to lead, due to the special cross section of the sealing device, to increased pressing of the sealing lips to the respective corresponding diffusor housing wall or gas generator wall in case of triggering of the air bag assembly unit and the resulting provision of the gas pressure for inflating the air bag by the gas generator. Thus, a possibly occurring decreasing elasticity of the sealing device after a longer installation time is also not associated with the risk of incomplete inflation of the air bag due to the intensification of the sealing action as a consequence of the V-shaped shape.

Moreover, it proved to be useful that the fastening ring has a stop device for the axial limitation of the motion of the gas generator in the direction of the installation opening of the diffusor housing in the mounted state of the gas generator. The stop device is designed such that it has a plurality of elastic stop tabs, which are arranged in such a way that they project on the inner side of the fastening ring. The embodiment of the stop device with the elastic stop tabs makes possible both the tolerance compensation of the gas generator to be mounted in the air bag assembly unit, wherein the correct position of the gas generator guarantees, in connection with the fastening ring and the preset fastening position thereof within the diffusor housing, a fixed position of the sealing device and hence satisfactory sealing action against the outer environment under all operating conditions.

An exemplary embodiment of the subject of the present invention will be explained below in more detail on the basis of the attached drawings. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DESCRIPTION OF THE PREFERRED EMBODIMENT

Figure 1:
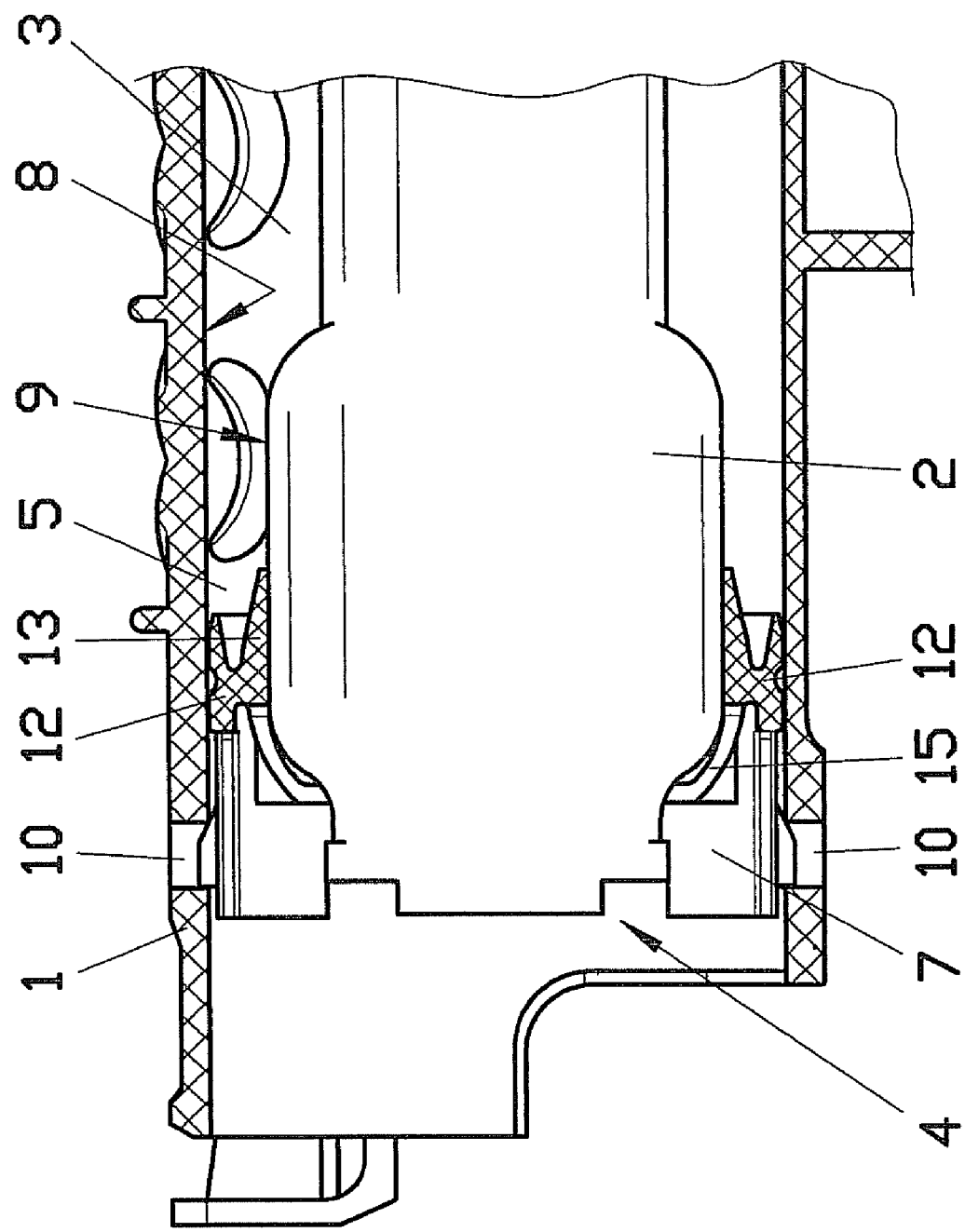
FIG. 1 is a partial sectional view taken through an air bag assembly unit according to the present invention with a connected diffusor housing and with a gas generator mounted in the diffusor housing.

Referring to the drawings in particular, an air bag housing, designated by reference number 1, a diffusor housing 3, as well as a gas generator 2 located within the diffusor housing 3 are shown as essential components of the air bag assembly unit. These components are shown in a partial area in FIG. 1 for an occupant restraint system in motor vehicles to illustrate the technical teaching of the present invention. The air bag assembly unit comprises, in addition to the components shown in FIG. 1, a housing area, in which an air bag, to be filled with gas by the contents of the gas generator 2, is stored in the folded state. In case of an accident, the gas generator is activated by means of a fuse composition, the gas produced by the gas generator 2 filling the air bag via a diffusor, not shown in FIG. 1.

The gas generator 2 is pushed into the diffusor housing 3 through an installation opening 4 during mounting. Before being pushed in, the gas generator 2 is provided with a fastening ring 7 at its free end shown. The fastening ring 7 and the gas generator 2 are then pushed together into the essentially cylindrically shaped interior space of the diffusor housing 3. As can be seen in FIG. 1, a plurality of recesses 10, into which a respective elastic holding tab 11 acting as a component of the fastening ring 7 snaps, are located within the diffusor housing wall 8, and they fix both the axial position and the radial position of the gas generator 2 in conjunction with the fastening ring 7.

It shall be added for the understanding of FIG. 1 that the other end of the gas generator 2, which end is located opposite to the fastening ring 7 and which is provided with gas discharge openings, comes into contact with a stop or the front wall of the diffusor housing 3 during the pushing in in the conventional manner. Due to the combination of recesses 10 and holding tabs 11, which is designed as a snap-in device, the gas generator is thus reliably prevented from being pushed out through the installation opening 4 in case of ignition of the gas generator 2 and the resulting increase in pressure within the diffusor housing 3. Simple mounting of the gas generator within the air bag assembly unit is thus guaranteed without an additional tool due to the fastening ring being designed in a special manner in such a way that positive-locking fixation of the fastening ring at the diffusor housing wall is brought about.

Figure 2:
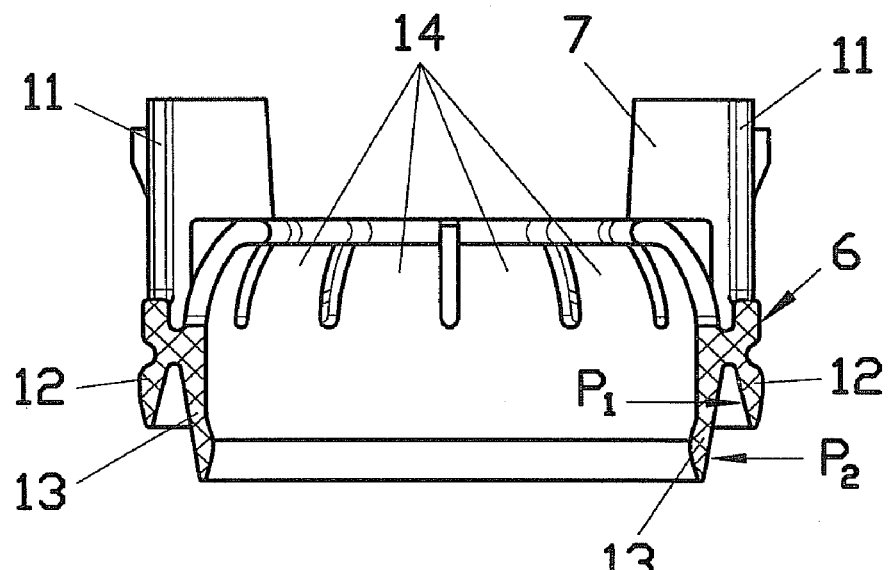
FIG. 2 is an enlarged sectional view of the fastening ring used according to the present invention.

The sectional view of the fastening ring 7 in FIG. 2 shows, moreover, in an enlarged view, the embodiment, which is responsible for the sealing of the interior space of the diffusor housing against the surrounding external space, by means of a sealing device 6, which comprises two sealing lips 12 and 13, which are arranged in cross section in relation to one another such that, on the whole, a circumferential cross-sectional area of a V-shaped design is obtained at the fastening ring 7. The leg ends of the sealing lips 12 and 13, which ends are connected to one another, point in the direction of the installation opening 4 of the air bag housing 1 in the installed state of the gas generator 2. In case the gas generator is triggered, an additional pressing force P1 is applied due to this design embodiment to the sealing lip 12, which is in contact with the gas generator wall 8, and a pressing force P2 is applied to the sealing lip 13, which is in contact with the gas generator wall 9. This leads to an increase in the sealing action unless a sufficient sealing action is already brought about by the elasticity of the material of the fastening ring 7.

Figure 3:
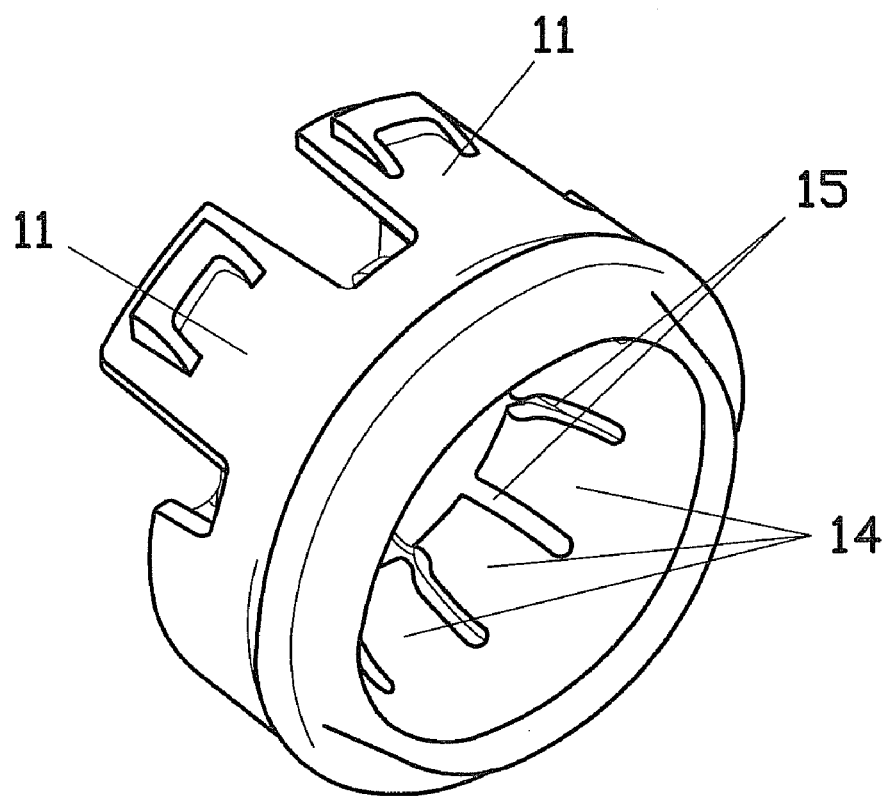
FIG. 3 is an overall perspective view of the fastening ring from FIG. 2.

Moreover, it can be determined from FIG. 2 as well as from FIG. 3 that the fastening ring 7 has a plurality of elastic stop tabs 14 on its inner side. These stop tabs 14 are arranged radially circumferentially on the inner side of the fastening ring 7 and receive a corresponding shoulder 15 of the gas generator 2. The measurements and the resulting elasticity of the stop tabs 14 are selected such that these possibly existing, slightly different length measurements of the gas generator 2 can be compensated, so that fixed positioning of the gas generator 2 in the diffusor housing 3 is always guaranteed.

The perspective view in FIG. 3 additionally shows that the fastening ring 7 has holding tabs 11 for fixing the fastening ring 7 within the recesses 10 of the diffusor housing wall 8. Moreover, it can be determined from FIG. 3 that the stop tabs 14 are separated from one another by slots 15, whose depth is, among other things, an indicator of the elasticity of the stop tabs and thus defines the ability to compensate tolerances for the longitudinal measurement of the gas generator 2.

The fastening ring 7 is made of a plastic, for example, polyamide, in this exemplary embodiment, as a result of which favorable manufacture of the component can be guaranteed. Moreover, it is conceivable to provide the material of the fastening ring 7 with fiber reinforcements for special applications.

While a specific embodiment of the invention has been shown and described in detail to illustrate the application of the principles of the invention, it will be understood that the invention may be embodied otherwise without departing from such principles.

The invention claimed is:

1. An air bag assembly unit for an occupant restraint system in motor vehicles, the air bag assembly unit comprising:
   an air bag;
   an air bag housing;
   a gas generator, said air bag being accommodated in said air bag housing to be filled with gas by the contents of said gas generator;
   a diffusor housing arranged at or forming a part of said air bag housing;
   a holding device, said gas generator being pushed in said diffuser housing, in an opening direction via an installation opening and being axially fixed in said diffusor housing by said holding device, the holding device comprising a fastening ring arranged in an intermediate space of said diffusor housing, said intermediate space being defined by a diffusor housing wall and a gas generator wall, and a sealing device sealing said intermediate space in a gas-tight manner and surrounding said gas generator in a ring-shaped manner, wherein said fastening ring is fixed at said diffusor housing wall in a positive-locking manner, said sealing device having at least two sealing lips, which are arranged on said fastening ring extending circumferentially about said sealing device and wherein said two sealing lips are arranged in relation to one another such that said sealing device forms an essentially V-shaped circumferential cross section, wherein each of said sealing lips forms a leg of said V-shaped cross section and wherein said legs are connected to one another and are arranged extending in a direction toward an interior of said diffusor housing.

2. An air bag unit for an occupant restraint system in motor vehicles in accordance with claim 1, wherein the positive-locking fixing of said fastening ring at said diffusor housing wall is provided by a snap-in device.

3. An air bag unit for an occupant restraint system in motor vehicles in accordance with claim 2, wherein the snap-in device has a plurality of elastic holding tabs arranged radially on an outer circumference of said fastening ring, and which mesh with corresponding recesses arranged on said diffusor housing wall in an installed state of said fastening ring.

4. An air bag unit for an occupant restraint system in motor vehicles in accordance with claim 3, wherein four of said holding tabs are arranged radially on the outer circumference of said fastening ring.

5. An air bag unit for an occupant restraint system in motor vehicles in accordance with claim 1, wherein said fastening ring has a stop device for limiting the axial motion of said gas generator in the direction of said installation opening of said diffusor housing in a mounted state of said gas generator.

6. An air bag unit for an occupant restraint system in motor vehicles in accordance with claim 5, wherein said stop device has a plurality of said elastic stop tabs, which are arranged in a projecting manner on an inner side of said fastening ring.

7. An air bag unit for an occupant restraint system in motor vehicles in accordance with claim 1, wherein said fastening ring is made of a plastic.

8. An air bag unit for an occupant restraint system in motor vehicles in accordance with claim 7, wherein said fastening ring consisting of a plastic having fiber reinforcements or stabilizing inserts.

9. An air bag assembly unit for an occupant restraint system in motor vehicles, the air bag assembly unit comprising:
   a gas generator;
   a diffusor housing; and
   a holding device, said gas generator being disposed in said diffuser housing and fixed therein by said holding device, an inner diffusor housing wall of said diffusor housing and an outer gas generator wall of said gas generator cooperating to define an intermediate space, said holding device comprising a fastening ring arranged in said intermediate space and a sealing device sealing said intermediate space in a gas-tight manner, said sealing device surrounding said gas generator in a ring-shaped manner with annular sealing lips extending circumferentially around said gas generator, said sealing lips being arranged with each sealing lip having a leg end connected to one another at a connection to form an essentially V-shaped circumferential cross section with each leg extending from said connection in a direction toward an interior of said diffusor housing, said fastening ring including positive locking fixing means for fixing said fastening ring at said diffusor housing wall in a positive-locking manner, said fastening ring and said sealing ring being formed in one piece.

10. An air bag unit in accordance with claim 9, wherein said fastening ring is made of a plastic.

11. An air bag unit in accordance with claim 9, wherein said fastening ring is formed of a plastic having fiber reinforcements or stabilizing inserts.

12. An air bag unit in accordance with claim 9, wherein said positive locking fixing means comprises a snap-in device.

13. An air bag unit in accordance with claim 12, wherein said snap-in device comprises a plurality of elastic holding tabs arranged radially on a outer circumference of said fastening ring and corresponding recesses arranged on said diffusor housing wall, said tabs being engaged in a respective one of said recesses in the installed state of said fastening ring.

14. An air bag unit in accordance with claim 13, wherein four of said holding tabs are arranged extending radially on the outer circumference of said fastening ring.

15. An air bag unit in accordance with claim 9, wherein said fastening ring has a stop device for limiting the axial motion of said gas generator in the direction of an installation opening of said diffusor housing in a mounted state of said gas generator.

16. An air bag unit in accordance with claim 15, wherein said stop device has a plurality of elastic stop tabs arranged in a projecting manner on an inner side of said fastening ring.

17. An air bag assembly unit for an occupant restraint system in motor vehicles, the air bag assembly unit comprising:
   a gas generator with a gas generator wall;
   a diffusor housing with an opening and with inner diffusor housing wall of said diffusor housing defining an interior, said diffusor housing having an insertion direction from said opening toward said interior; and
   a holding device comprising a fastening ring with a stop structure for engaging the gas generator and positive locking fixing means for fixing said fastening ring at said diffusor housing wall in a positive-locking manner with said stop structure engaging said gas generator to prevent said gas generator from moving out of said interior by preventing movement of said gas generator in an axial direction opposite to said insertion direction, and a sealing device including an annular first sealing lip in contact with said diffusor housing wall over a full circumferential extent of said diffusor housing wall and an annular second sealing lip in contact with said gas generator wall over a full circumferential extent of said diffusor housing wall, a leg end of said first sealing lip being joined to a leg end of said second sealing lip at a connection to provide a seal portion with a V-shaped circumferential cross section with said first sealing lip and said second sealing lip extending away from said connection and extending in said insertion direction.

18. An air bag unit in accordance with claim 17, wherein said positive locking fixing means comprises a snap-in device comprising a plurality of elastic holding tabs arranged radially on the outer circumference of said fastening ring and corresponding recesses arranged on said diffusor housing wall, said tabs being engaged in a respective one of said recesses in the installed state of said fastening ring.

19. An air bag unit in accordance with claim 18, wherein said stop structure comprises a plurality of elastic stop tabs, which are arranged in a projecting manner on the inner side of said fastening ring.

20. An air bag unit in accordance with claim 19, wherein said fastening ring and said sealing ring are formed in one piece.

* * * * *